Patented June 19, 1951

2,557,132

UNITED STATES PATENT OFFICE 2,557,132

PREPARATION OF POLYMETAPHOSPHORIC ACID SOLUTIONS FROM KURROL SALTS

Walter E. Mochel, Wilmington, Del., assignor to E. I. du Pont de Nemours & Company, Wilmington, Del., a corporation of Delaware No Drawing. Application November 13, 1948, Serial No. 59,965

3 Claims. (Cl. 23—107)

This invention relates to the preparation of polymetaphosphoric acid solutions and is more particularly directed to the preparation of polymetaphosphoric acid solutions by contacting a polymetaphosphate with a cation-exchanger in its hydrogen form.

Polymetaphosphates have heretofore been solubilized by treatment with salts such as sodium chloride. The resulting solutions contain chlorides which cannot practically be entirely removed.

It is an object of this invention to provide simple and direct processes for the preparation of solutions of polymetaphosphoric acid. It is a further object to provide processes for the production of polymetaphosphoric acid solutions of high purity from insoluble polymetaphosphates. Still further objects will become apparent hereinafter.

The foregoing and other objects of the invention are attained by contacting a Kurrol salt with an insoluble cation-exchanger in its hydrogen form.

Sodium or potassium polymetaphosphates for treatment according to the invention are thought to be linear polymers. The products are not soluble as such in water, though, of course, they can be dissolved in water if they are changed partially or entirely into something else. Most, if not all, of the linear polymetaphosphates which are water-insoluble are also crystalline in structure. These polymetaphosphates suitable for use according to the invention are customarily called Kurrol salts.

The Kurrol salts and their preparation are well known in the literature and reference may be had, for instance, to an article by Karbe and Jander Kolloid-Beihefte 54, pp. 105–230 (1943).

The sodium Kurrol salt is rather difficult to prepare and it will ordinarily be preferred to use the potassium Kurrol salt. The lithium salt or another insoluble salt could similarly be used.

Kurrol salts may be prepared according to the methods shown in the art. Perhaps the easiest way to prepare to potassium Kurrol salt is to heat potassium dihydrogen phosphate to produce a crystalline product. The product thus produced is water-insoluble as such but, like other polymetaphosphates suitable for use according to the invention, it can be solubilized by treatment with another salt such as sodium chloride or a soluble metaphosphate such as sodium hexametaphosphate.

Now as has been observed above the polymetaphosphates which are to be treated according to the invention are insoluble in pure water but can be dissolved if the water contains a dissolved salt which has a different cation from the Kurrol salt. The resulting solutions necessarily contain the anion of the dissolved salt and are consequently impure.

To prepare pure polymetaphosphate solutions according to the invention a Kurrol salt is brought into contact with an insoluble cation-exchanger in its hydrogen form. The cation-exchanger will remove the cation of the polymetaphosphate and there will be left in the solution substantially pure polymetaphosphoric acid.

Contact between a Kurrol salt and a cation-exchanger will ordinarily be accomplished by forming a suspension or the Kurrol salt in water and then bringing this suspension into contact with the cation-exchanger. The suspension can first be brought into contact with a comparatively small portion of the total amount of cation-exchanger to be used. This converts a portion of the polymetaphosphate to the acid and causes the entire quantity of suspended polymetaphosphate to be dissolved. The resulting solution is then quickly brought into contact with the remaining portion of the cation-exchanger. Alternatively the suspension may, of course, be brought into contact with the entire quantity of cation-exchanger or may be allowed to flow upwardly or downwardly thru a bed of cation-exchanger.

The amount of water is comparatively unimportant though it should be maintained as low as is feasible in order to produce relatively concentrated solutions and yet enough water must be present to allow handling of the mixture. Generally, the concentration of Kurrol salt should be below about 10% by weight of the water used.

The reaction should be operated as rapidly as possible and the temperature should be held as low as is feasible. The temperature should preferably be below room temperature but in any event it is preferable that it be below about 50° C.

The products produced by the treatment of a Kurrol salt with a cation-exchanger will be substantially or entirely free from salts, and they can be as free as desired from the cation. It will be understood that it will not always be desirable to remove the cation entirely and in some instances it will be sufficient to remove enough of the cation to effect solubilization of all of the polymetaphosphate.

The technique of effecting the cation-exchange is generally well understood and an extensive description is not necessary. The processes such as those of the Bird Patent 2,244,325 may be used as may techniques like those generally described in Hurd 2,431,481. The literature is also full of references to the cation-exchanger materials and to their application to various problems.

Any insoluble cation-exchanger in its hydrogen form may be used in processes of the invention and there may be used for instance the hydrogen form of sulfonated carbonaceous exchangers or of sulfonated or sulfited insoluble phenolformaldehyde resins or acid-treated humic material or other similar exchangers. Sulfonated coal, lignin, peat, or other insoluble sulfonated humic organic material may be used.

Even more preferable are the insoluble resins made from phenols, such as those made from phenol itself, diphenylol sulfone, catechol, or naturally occurring phenols as found, for example, in quebracho, and an aldehyde, particularly formaldehyde, which are modified by the introduction of sulfonic groups either in the ring or on methylene groups. Cation-exchangers which are stable in their hydrogen forms are available commercially under such trade names as "Amberlite," "Ionex," "ZeoKarb," "Nalcite," "Ionac," etc.

The exchanger is generally prepared in a granular form which is readily leached free of soluble acids or salts. If the exchangers are partially or wholly in a salt form they may be converted to their acid forms by washing with a solution of an acid such as hydrochloric, sulfuric, formic, sulfamic, or the like. Excess acid may then be rinsed from the product.

One of the preferred cation-exchange resins for use according to the present invention is an aromatic hydrocarbon polymer containing nuclear sulfonic acid groups which is designated "Dowex 50" and of the general type described in D'Alelio 2,366,007 and which is fully described as to its characteristics, properties, and general mode of use in the Journal of the American Chemical Society for November 1947, volume 69, No. 11, beginning at page 2830.

The quantity of cation-exchanger to use will be determined in accordance with practices generally well known in the art. If it is desired to remove substantially all of the cation, then the requisite quantity of cation-exchanger can readily be determined by experiment. More than is needed can be used and it can be used with successive batches until exhausted. It will often be found desirable to treat the solutions with a second fresh batch of cation-exchanger for removing the last of the cation.

The polymetaphosphoric acid solutions prepared according to processes of the invention are very pure. They are substantially free from salts other than any potassium polymetaphosphate which remains unconverted.

The polymetaphosphoric acid solutions can readily be converted to soluble potassium polymetaphosphate solutions by treatment with potassium hydroxide. The solutions thus prepared will have very high viscosity and will be comparatively stable.

The sodium salt may similarly be prepared. The polymetaphosphoric acid solutions may similarly be reacted with other products.

In order that the invention may be better understood reference should be had to the following illustrative example.

*Example*

A high molecular weight potassium polymetaphosphate was first prepared. This was done by heating pure potassium dihydrogen phosphate to 675° C. for forty minutes. The resulting product was quickly cooled and was found to be a crystalline material.

One part by weight of finely pulverized crystalline potassium polymetaphosphate obtained in this manner was stirred in fifty parts by weight of water together with seven parts by weight of "Dowex 50" in its acid form. The suspended potassium polymetaphosphate rapidly went into solution. The resin was removed from the solution by filtration.

The solution thus prepared was treated with potassium hydroxide to produce a viscous solution suitable for the modification of film-forming and coating compositions.

I claim:

1. In a process for the production of a water solution of polymetaphosphoric acid, the step comprising contacting a water suspension of Kurrol salt with an insoluble cation-exchanger in its hydrogen form to form polymetaphosphoric acid from said suspended Kurrol salt.

2. In a process for the production of a water solution of polymetaphosphoric acid, the step comprising contacting a water suspension of potassium Kurrol salt with an insoluble cation-exchanger in its hydrogen form to form polymetaphosphoric acid from said suspended Kurrol salt.

3. In a process for dissolving a water-insoluble polymetaphosphate in water, the step comprising contacting a water suspension of the polymetaphosphate with an insoluble cation-exchanger in its hydrogen form to cause it to go into solution at least partly as the polymetaphosphoric acid.

WALTER E. MOCHEL.

REFERENCES CITED

The following references are of record in the file of this patent:

UNITED STATES PATENTS

| Number | Name | Date |
|---|---|---|
| 2,130,557 | Munter | Sept. 20, 1938 |
| 2,414,742 | Jackson | Jan. 21, 1947 |

FOREIGN PATENTS

| Number | Country | Date |
|---|---|---|
| 547,019 | Great Britain | Aug. 10, 1942 |

OTHER REFERENCES

Audrieth et al.: Journal of Chemical Education, Feb. 1948, pages 80 and 81.

Kunin: Ind. and Engr. Chem., vol. 40, No. 1, Jan. 1948, pp. 41–45.